US012407968B2

(12) United States Patent
Loudenslager

(10) Patent No.: US 12,407,968 B2
(45) Date of Patent: Sep. 2, 2025

(54) MICROPHONE ASSEMBLY WITH PARTICLE FILTRATION SYSTEM

(71) Applicant: Louchen IP, LLC, Campbell, CA (US)

(72) Inventor: Brian A. Loudenslager, San Jose, CA (US)

(73) Assignee: Louchen IP, LLC, Campbell, CA (US)

( * ) Notice: Subject to any disclaimer, the term of this patent is extended or adjusted under 35 U.S.C. 154(b) by 182 days.

(21) Appl. No.: 18/209,739

(22) Filed: Jun. 14, 2023

(65) Prior Publication Data

US 2023/0412957 A1 Dec. 21, 2023

Related U.S. Application Data

(60) Provisional application No. 63/352,089, filed on Jun. 14, 2022.

(51) Int. Cl.
*H04R 1/08* (2006.01)
*D04H 1/00* (2006.01)

(52) U.S. Cl.
CPC ............... *H04R 1/086* (2013.01); *D04H 1/00* (2013.01); *D10B 2401/10* (2013.01); *D10B 2401/16* (2013.01)

(58) Field of Classification Search
CPC ...... H04R 1/086; D04H 1/00; D10B 2401/10; D10B 2401/16
See application file for complete search history.

(56) References Cited

U.S. PATENT DOCUMENTS 7,496,208 B2 2/2009 Uchimura
9,565,488 B2 2/2017 Friza et al.
10,225,663 B2 3/2019 Ikeda
2004/0262217 A1* 12/2004 Mori .................. B01D 39/1692 210/493.1
2023/0106070 A1* 4/2023 Alwicker ................. H04R 1/04 381/359

FOREIGN PATENT DOCUMENTS

CN 213152311 U 5/2021
CN 214154785 U 9/2021
CN 216122797 U 3/2022
EP 1313538 B1 * 8/2008 ......... B01D 39/1623
WO 2018148871 A1 8/2018

OTHER PUBLICATIONS

International Search Report and Written Opinion for Application No. PCT/US2023/025278, dated Oct. 12, 2023.

* cited by examiner

*Primary Examiner* — Sunita Joshi
(74) *Attorney, Agent, or Firm* — Ryan T. Grace; Advent, LLP

(57) ABSTRACT

A microphone assembly having a particle filtration system. The microphone filtration system may include an outer support structure, at least one filtration layer, an inner support structure, and a sleeve. The microphone filtration system is configured to seal a transducer chamber of the microphone assembly from the outside environment, and trap particles that may buildup and corrode a transducer housed by the transducer chamber. The at least one filtration layer of the particle filtration system provides a Minimum Efficient Reporting Value (MERV) rating greater than or equal to 13 while minimizing attenuation and distortion of the soundwaves entering the transducer chamber.

24 Claims, 5 Drawing Sheets

MICROPHONE ASSEMBLY WITH PARTICLE FILTRATION SYSTEM

BACKGROUND

Microphones are transducers that convert air pressure variations of sound waves into electrical signals. Microphones are used in many applications, and often require to be used by more than one user. Different particles such as smoke, dust, pollen, and aerosols may enter a transducer chamber and damage the transducer housed within it.

DRAWINGS

The Detailed Description is described with reference to the accompanying figures. The use of the same reference numbers in different instances in the description and the figures may indicate similar or identical items.

DETAILED DESCRIPTION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Typical portable microphone filters include pop-filters with screens made of metal, nylon, and open-cell and/or polyurethane foam intended to prevent "pops" caused by plosives. Plosives are sounds associated with consonants in which air flow from the lungs of a user is interrupted by a closure of the mouth followed by a sudden release of breath. The rush of air that reaches the microphone causes a deformation of an electrical signal transmitted by a transducer of the microphone, creating an acoustic reflection.

Portable acoustic filters made of open-cell and/or polyurethane foam and windscreens made of open-cell and/or polyurethane foam may cover a transducer chamber of the microphone. These devices are intended to reduce acoustic reflections but do not prevent debris from entering the transducer chamber. Portable windsocks made of polyurethane foam and/or fur, synthetic fur or otherwise, and "baskets" or "blimps" with a fully enclosed chamber lined with open-cell foam or fur are intended to block the wind may significantly attenuate the soundwaves entering the microphone.

The Minimum Efficiency Reporting Value (MERV) is a rating derived from a test method developed by the American Society of Heating, Refrigerating, and Air Conditioning Engineers. The MERV rating reports a filter's ability to capture particles between 0.3 microns and 10 microns (μm). The Higher the MERV rating, the better the filter is at trapping specific types of particles.

The present disclosure describes example embodiments of a microphone assembly having a MERV-rated particle filtration system that prevents debris and particles from reaching a microphone transducer, while minimizing sound distortion and attenuation of the original soundwaves.

DETAILED DESCRIPTION OF EXAMPLE EMBODIMENTS

Figure 1:
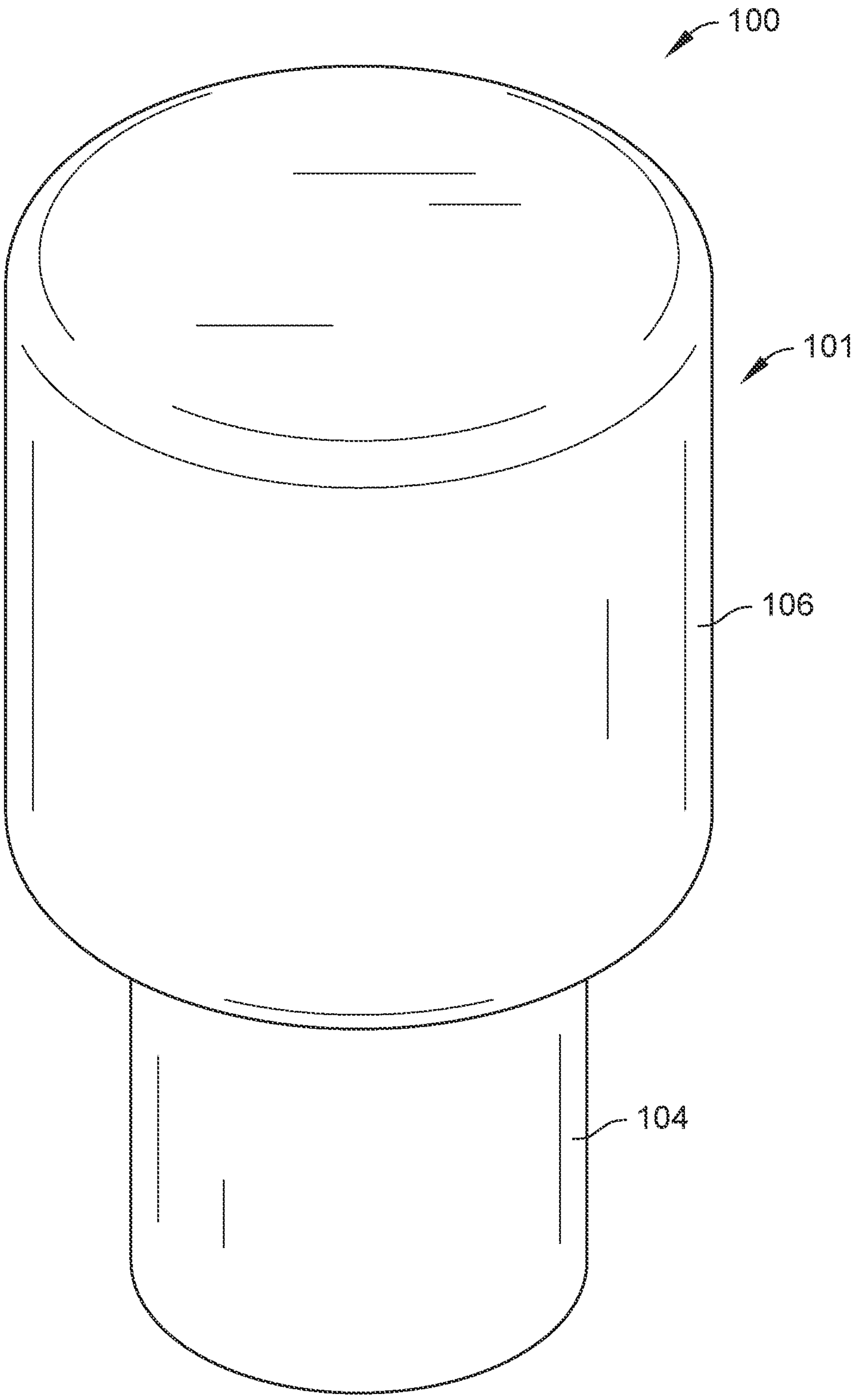
FIG. 1 is an isometric side view of a microphone assembly with a particulate filtration system in accordance with example embodiments of the present disclosure.
Figure 2:
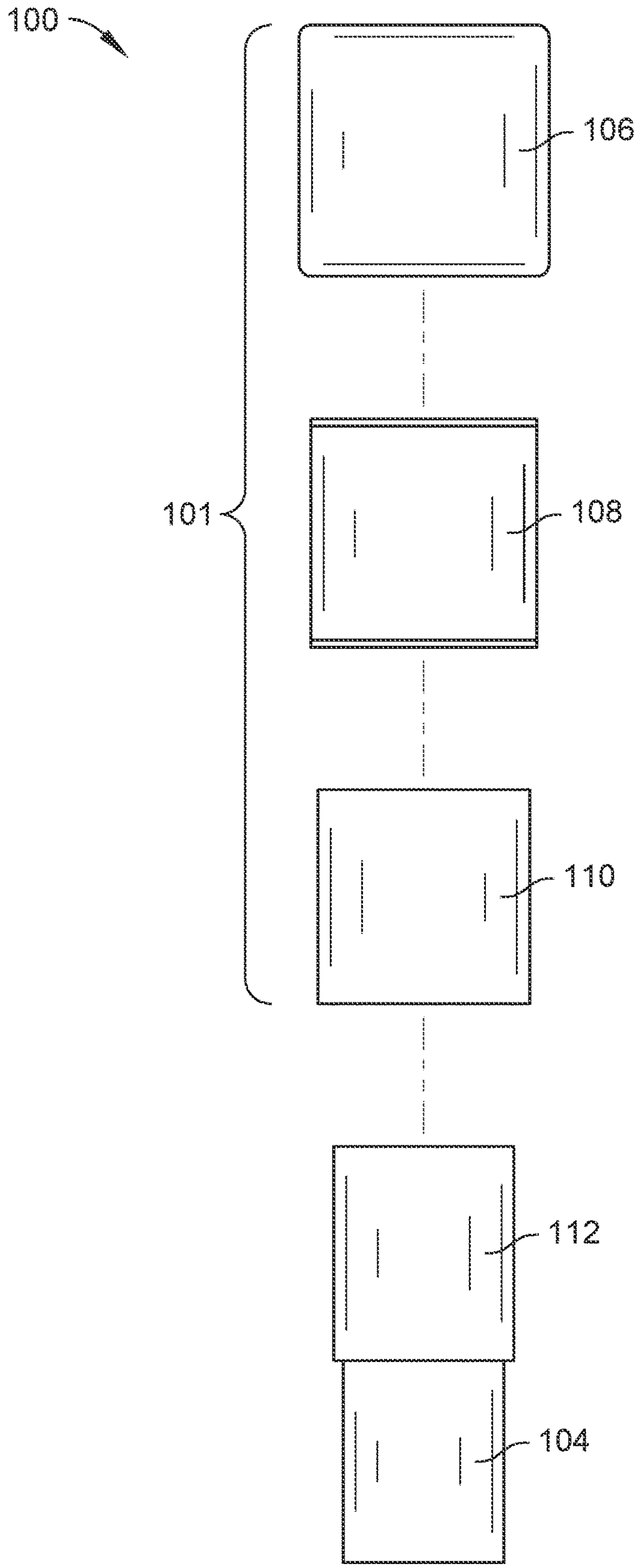
FIG. 2 is an exploded side view of the microphone assembly with a particulate filtration system shown in FIG. 1 in accordance with example embodiments of the present disclosure.
Figure 3:
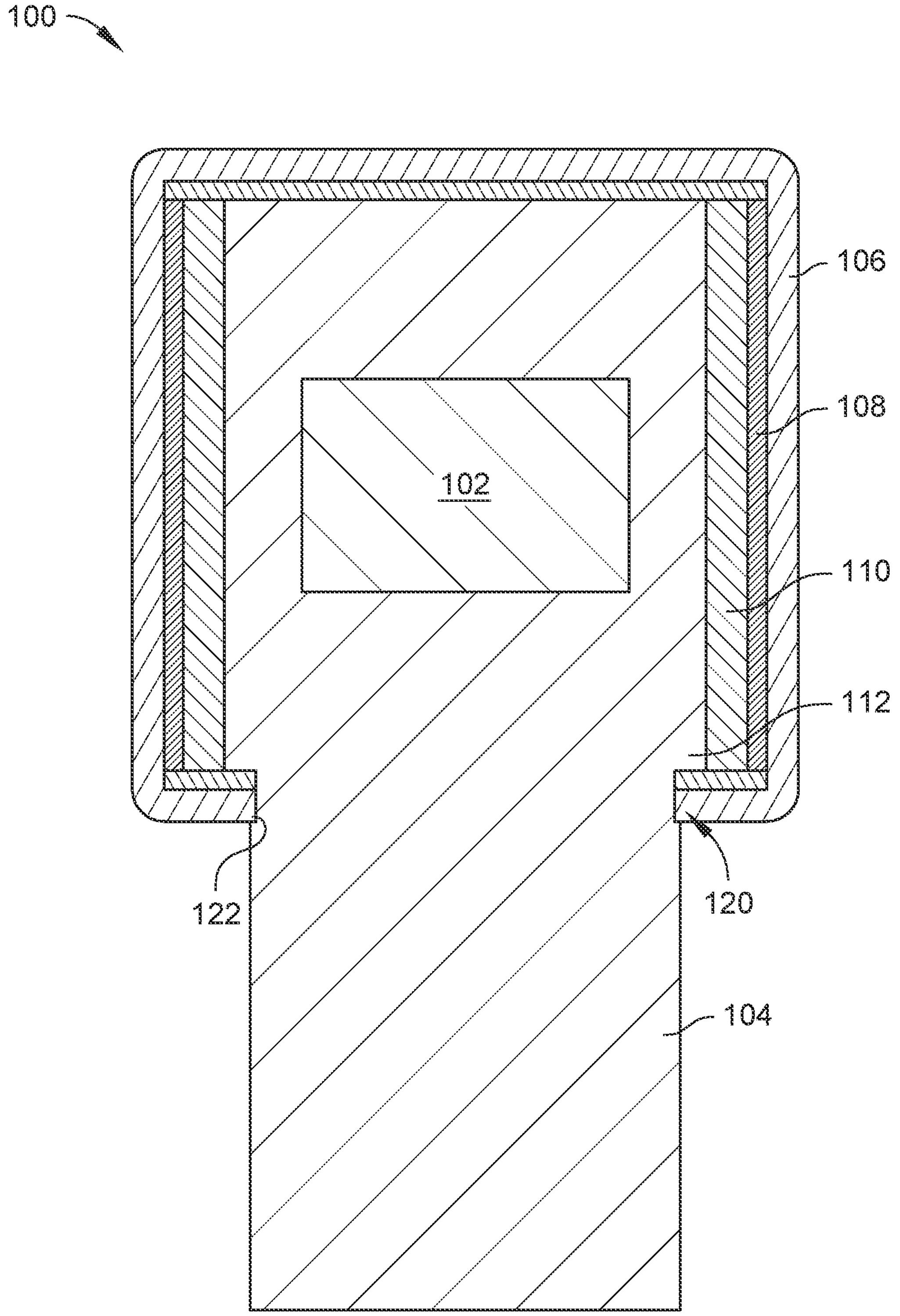
FIG. 3 is a cross-sectional side view of the microphone assembly with a particulate filtration system shown in FIG. 1 in accordance with example embodiments of the present disclosure.

Referring generally to FIGS. 1 through 3, a microphone assembly 100 includes a transducer 102 housed within a transducer chamber 112, a particle filtration system 101, and a microphone body 104. In the transducer chamber 112, the transducer 102 converts sound waves into electrical signals (not shown) and transmits the electrical signals to a receiver through an output (not shown). The microphone assembly 100 may be a corded microphone, also called a cable microphone, connected to sound system (not shown) via a cable, or a cordless microphone.

The microphone body 104 houses components of the microphone assembly 100 such as, but not limited to, an internal power source such as a battery (not shown), a built-in transmitter (not shown), or an output cable. The output cable transmits the electrical signals to the sound system, where the electrical signal is converted into audio. In example embodiments, the microphone body 104 may define a handle to be held by a user or set up on a stand (not shown).

In example embodiments, the microphone assembly 100 may be a dynamic microphone (also known as a moving-coil microphone), a condenser microphone (also known as a capacitor microphone, or an electrostatic microphone), a ribbon microphone, or another microphone used in sound recording or sound amplification.

In an example embodiment where the microphone assembly 100 is a dynamic microphone, the transducer 102 may include a diaphragm, a coil, and a magnetic core (not shown). The coil may be attached to the diaphragm and wound around the magnetic core. The coil vibrates along with the diaphragm as sound enters the transducer chamber 112. As the diaphragm vibrates, the coil moves back and forth in a magnetic field produced by the magnetic core. The motion of the coil in the magnetic field generates the electrical signal corresponding to the sound picked up by the transducer. In example embodiments, the diaphragm may be composed of a metal (e.g., aluminum, etc.) or a plastic.

In an example embodiment where the microphone assembly 100 is a condenser microphone, the transducer 102 may include a pair of capacitor plates (not shown) including a front plate, also called a diaphragm, and a back plate, and a voltage source. The voltage source may be a battery or a phantom power source. In the condenser microphone, the power source supplies a voltage to the pair of capacitor plates. The diaphragm vibrates when struck by sound waves, changing the distance between the pair of capacitor plates and therefore changing the capacitance. Specifically, when the plates are closer together, capacitance increases and a charge current occurs. When the plates are further apart, capacitance decreases and a discharge current occurs. These changes in capacitance may be used to measure the audio signal.

The particle filtration system 101 may include an outer support structure 106, at least one filtration layer 108, and a sleeve 110. The outer support structure 106 is configured to support the at least one filtration layer 108. The outer support structure 106 may be composed of a textile material, a plastic (e.g., nylon, etc.), a solid foam, a metal, or combinations thereof. In other embodiments the particle filtration system may include an inner support structure disposed between the at least one filtration layer 108 and the sleeve 110 and/or between the sleeve 110 and the transducer chamber 112. The inner support structure may be composed of the same material of the outer support structure 106 or may be composed of a different material than the outer support structure 106. The inner support structure may be composed of a textile material, a plastic, a solid foam, a metal, or combinations thereof.

The particle filtration system 101 reduces the buildup of particles of foreign materials on the transducer 102, extending the life of the microphone assembly 100. The particle filtration system 101 may help reduce the frequency at which maintenance and cleaning of the microphone assembly 100 is needed. Additionally, the particle filtration system 101 may reduce the need for restoring the microphone assembly 100 and/or replacing parts of the microphone assembly 100.

The particle filtration system 101 may trap smoke, spittle, droplet nuclei, dust, mold spores, dust mites, pollen, and aerosols, among other particles, preventing them from reaching the transducer chamber 112 and causing buildup and damage to the transducer 102. In example embodiments, the particle filtration system 101 traps particles, reducing the spread of viruses and bacteria by preventing the particles from attaching to the surfaces of the microphone assembly 100, for example the transducer chamber 112, thereby reducing the user's exposure to particles left behind on the microphone assembly 100 from previous users.

In embodiments, the outer support structure 106 may be composed of reticulated foam, or another type of porous, low-density, open-cell solid foam. For example, the outer support structure 106 may be composed of a reticulated polyester urethane foam or a reticulated polyether urethane foam, or a combination thereof. In embodiments, the outer support structure 106 may have a porosity of less than or equal to about fifty-five pores per square inch (55 PPI). For example, the outer support structure 106 may have a porosity ranging from 4 PPI up to about 55 PPI. In embodiments, the outer support structure may have a porosity of about 10 PPI to about 45 PPI. In other embodiments, the support structure may be composed of a low-density, closed-cell foam.

In example embodiments of the present disclosure, the at least one filtration layer 108 has a MERV rating of 13 or above. The at least one filtration layer 108 may trap at least fifty percent (50%) of particles between 0.3 μm and 1 μm. The at least one filtration layer 108 may trap more than or equal to about eighty-five percent (85%) of particles between 1 μm and 3 μm. The at least one filtration layer 108 may trap more than or equal to about ninety percent (90%) of particles between 3 μm and 10 μm.

In example embodiments of the present disclosure, the at least one filtration layer 108 has a MERV rating of 14 or above. The at least one filtration layer 108 may trap at least seventy-five percent (75%) of particles between 0.3 μm and 1 μm. The at least one filtration layer 108 may trap more than or equal to about ninety percent (90%) of particles between 1 μm and 3 μm. The at least one filtration layer 108 may trap more than or equal to about ninety-five percent (95%) of particles between 3 μm and 10 μm.

In example embodiments of the present disclosure, the at least one filtration layer 108 has a MERV rating of 15 or above. The at least one filtration layer 108 may trap at least eighty-five percent (85%) of particles between 0.3 μm and 1 μm. The at least one filtration layer 108 may trap more than or equal to about ninety percent (90%) of particles between 1 μm and 3 μm. The at least one filtration layer 108 may trap more than or equal to about ninety-five percent (95%) of particles between 3 μm and 10 μm.

In example embodiments of the present disclosure, the at least one filtration layer 108 has a MERV rating of 16 or above. The at least one filtration layer 108 may trap at least ninety-five percent (95%) of particles between 0.3 μm and 1 μm. The at least one filtration layer 108 may trap more than or equal to about ninety-five percent (95%) of particles between 1 μm and 3 μm. The at least one filtration layer 108 may trap more than or equal to about ninety-five percent (95%) of particles between 3 μm and 10 μm.

In example embodiments, the at least one filtration layer 108 may be composed of an electrostatic media filter, a nonwoven fabric filter, an activated carbon filter, or a combination thereof. In example embodiments, the particle filtration system 101 may be composed of one or more layers of an electrostatic media filter, one or more layers of a nonwoven fabric filter, and one or more layers of an activated carbon filter.

Electrostatic media filters may be manufactured from synthetic fibers that utilize mechanical filtration and provide an electrostatic charge. The electrostatic charge of the synthetic fibers may be inherent to the material or added during production through processes such as electrostatic induction, triboelectric charging, corona charging, etc. The electrostatic attraction effect of electrostatic media filters draws particles towards the synthetic fibers, providing an improved filtration efficiency over uncharged media. Electrostatic media filters may also provide a reduced pressure drop. In example embodiments, the electrostatic media filter may be used either alone or in combination with a different filtration layer 108.

Nonwoven fabric filters may be manufactured as an engineered fabric including a random arrangement of filaments or fabrics. The nonwoven fabric filter may be meltblown or spunbound nonwoven media filters. In example embodiments, the nonwoven fabric filter may be used either alone or in combination with a different filtration layer 108.

Activated carbon filters may use charcoal that is treated with oxygen to make the charcoal more absorbent through an adsorption process. In the adsorption process, gas molecules cling to pores of the activated carbon. This adsorption process allows the activated carbon to filter out gases, odors, and/or volatile organic compounds (VOCs) from the air entering the transducer chamber 112 and contacting the transducer 102. In example embodiments, the nonwoven fabric filter may be used either alone or in combination with a different filtration layer 108.

In example embodiments where the at least one filtration layer 108 is an electrostatic media filter and/or an activated carbon filter, the at least one filtration layer 108 has a thickness between about 0.1 inches to about 0.5 inches. In example embodiments where the at least one filtration later 108 is a nonwoven fabric filter, the at least one filtration layer 108 has a thickness between about 0.1 inches to about 0.5 inches and/or a density less than or equal to 120 grams per square meter (GSM).

The at least one filtration layer 108 minimizes the distortion and attenuation of the original soundwaves received by the transducer 102. In example embodiments, the at least one filtration layer 108 may minimize distortion of the original soundwaves by an average of between about 0.1 decibels (dB) to about 5 dB re 1 V/Pa from frequencies between about 20 Hz to about 20,000 Hz.

In example embodiments, the sleeve 110 is removably attached to the transducer chamber 112, covering the periphery of the transducer chamber 112. The sleeve 110 may have different shapes and/or sizes, based on the type and size of the microphone assembly 100 and the transducer chamber 112. The sleeve may be composed of a reticulated foam such as the one described above. In other embodiments, the sleeve may be composed of a textile material, a plastic, a solid foam, or combinations thereof.

The sleeve 110 is configured to grip the at least one filter layer 108 to the transducer chamber 112. In example embodiments, the sleeve 110 may include a fastener and/or an adhesive to grip the at least one filter layer 108 to the transducer chamber 112, preventing the at least one filter layer 108 from sliding off the transducer chamber 112 and securing the seal of the particle filtration system 101. For example, the sleeve 110 may include an epoxy adhesive, a polyurethane adhesive, an/or a polyimide adhesive, or a combination thereof that bonds the sleeve 110 to the filtration layer 108. The material selected for the adhesive does not create interference of the soundwaves received by the transducer 102.

In other embodiments, the at least one filtration layer 108 may be sewn into the sleeve 110. The thread used to secure the at least one filtration layer 108 and the sleeve 110 may be selected from at least one of a spun thread, a corespun thread, a textured thread, or a monofilament thread, or a bonded thread. The material selected for the thread does not create interference of the soundwaves received by the transducer 102.

In example embodiments, the microphone body 104 may include a ridge 122 around the periphery of the transducer chamber 112. The particle filtration system 101 may fit into the ridge 122 to create a seal 120. In other example embodiments, the microphone body may include an outer ring. The sleeve 110 may conform to the shape of the ridge 122 or the outer ring to seal the transducer chamber 122 from the outside environment. In other embodiments (not shown) the particle filtration system may include a gasket between the sleeve 110 and the transducer chamber 112. The gasket may be composed of rubber, plastic, metal, or another material that would seal the transducer chamber 112 from the outside environment.

Figure 4:
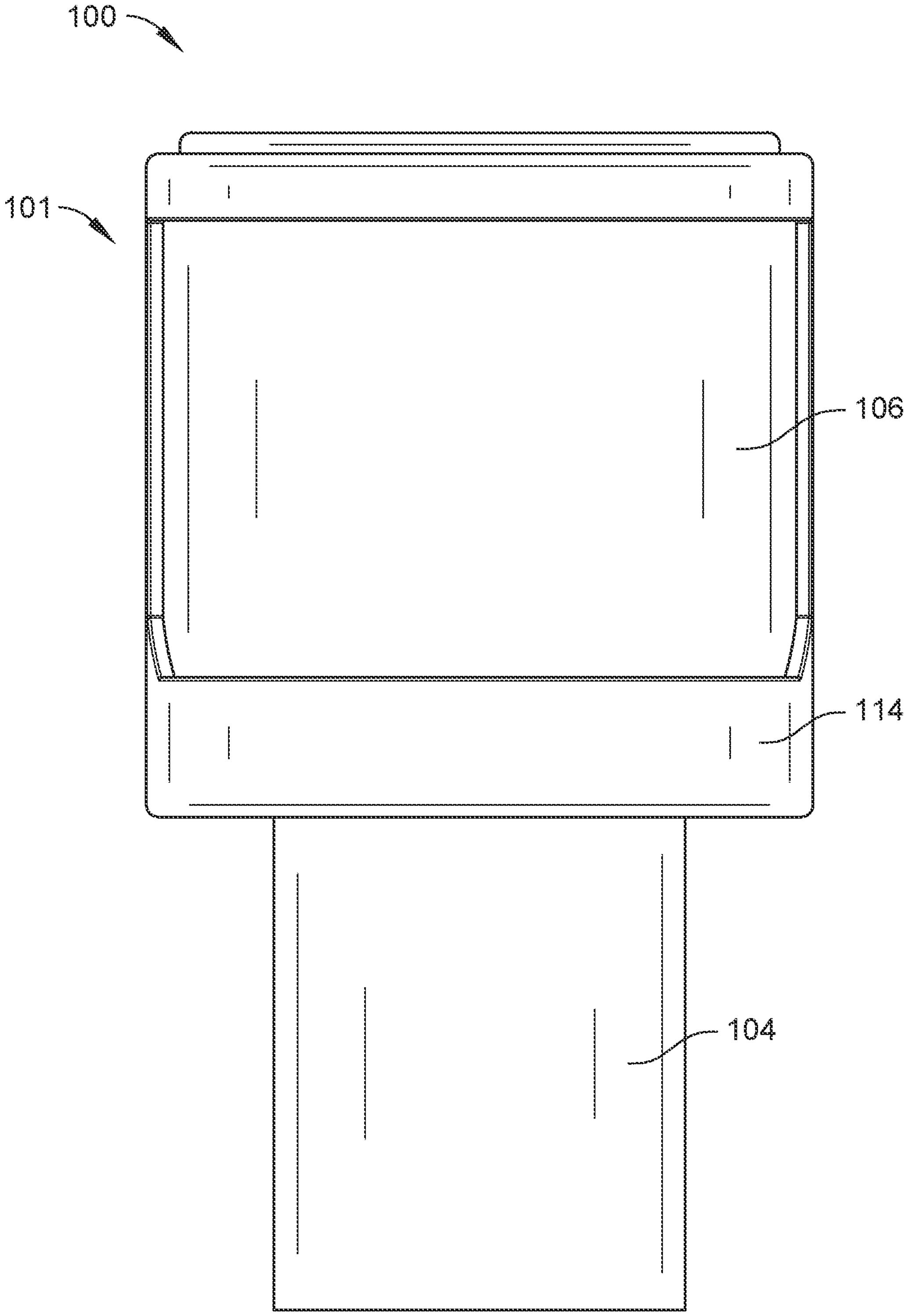
FIG. 4 is an isometric side view of a microphone assembly with a particulate filtration system having an outer frame in accordance with example embodiments of the present disclosure.
Figure 5:
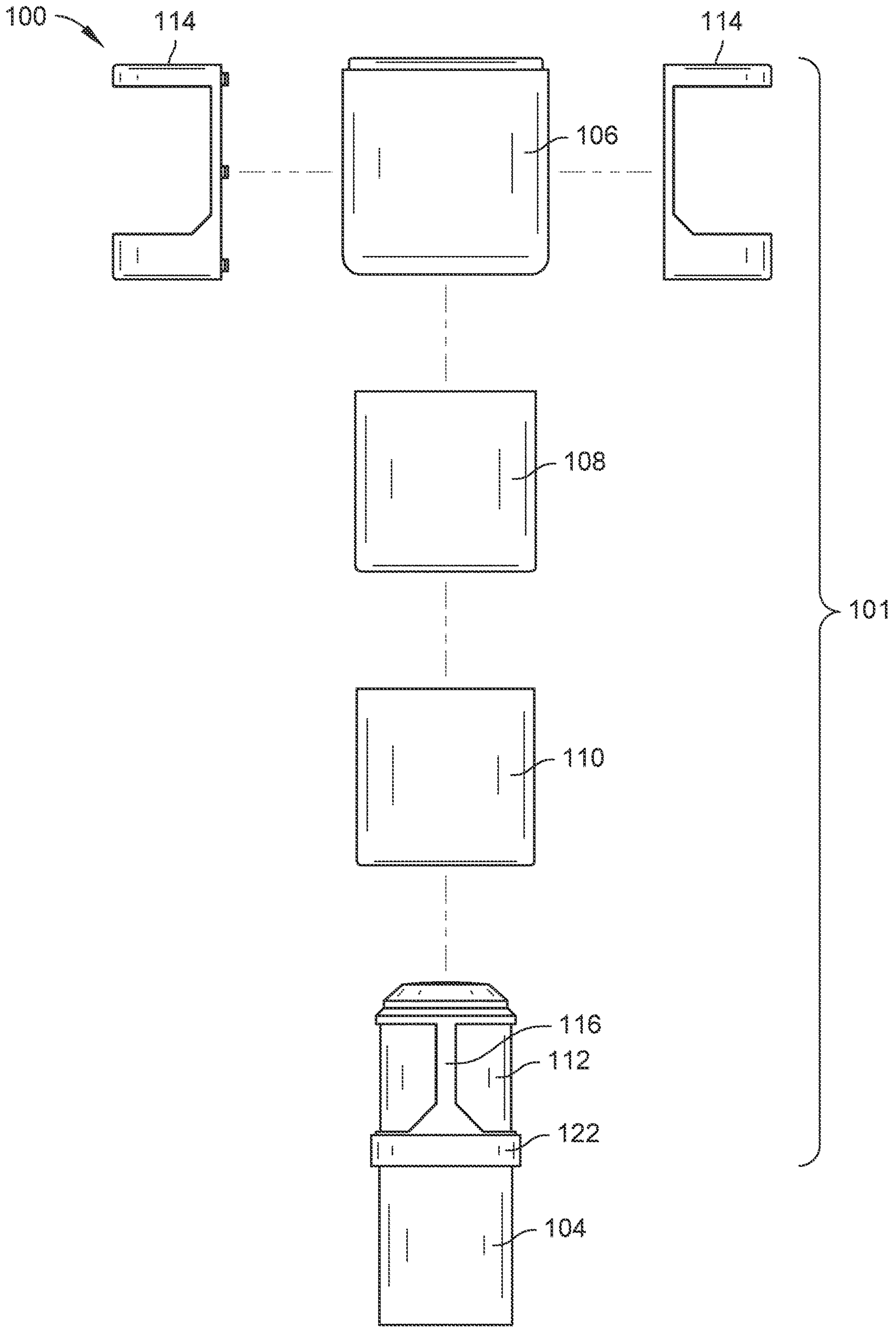
FIG. 5 is an exploded side view of the microphone assembly with a particulate filtration system having an outer frame shown in FIG. 4 in accordance with example embodiments of the present disclosure.

Generally referring to FIGS. 4 through 5, the particle filtration system 101 may include an outer frame 114, an outer support structure 106, at least one filtration layer 108, an inner support structure 116 and a sleeve 110. In other embodiments (not shown) the particle filtration system may not include a sleeve and the inner support structure provides the necessary support for the at least one filtration layer to be coupled to the transducer assembly.

The particle filtration system 101 is configured to cover the entirety of the transducer chamber 112. In example embodiments, the outer frame 114 may house the outer support structure 106. The outer support structure is configured to support the at least one filtration layer 108. The inner support structure 116 may be disposed within the at least one filtration layer 108 and the sleeve 110 and/or between the sleeve 110 and the transducer chamber 112. The at least one filtration layer 108 seals the transducer chamber 112 away from contact with the outside environment. In example embodiments (not shown) the inner support structure may house at least a second filtration layer. The inner support structure may be a frame having vertical and/or horizontal members that separate the at least one filtration system from the transducer chamber. The inner support structure may include a plurality of parallel rings (not shown) surrounding the periphery of the transducer chamber.

In other embodiments, the particle filtration system includes at least one filtration layer having a MERV rating of 13 or above stretched over a support frame. The support frame may be circular, oval, squared, rectangular etc. The support frame may be coupled to a microphone assembly through a mounting bracket or shaft with a fastener (e.g., a clip, a clamp, etc.). The filtration system may include a support structure attached to a front and/or a back of the support frame, where the support structure may be composed of a plastic, a solid foam, a metal, or combinations thereof, such as the outer support structure and the inner support structure described herein. This embodiment of the particle filtration system may be used as a pop filter and attenuate the sound of plosive sounds from recordings, etc.

In example embodiments (not shown), the at least one filtration layer 108 may be further divided into a top lid filtration layer and outer periphery filtration layer, wherein the outer periphery filtration layer is generally cylindrical. The top lid filtration layer may be attached to the outer periphery filtration layer by heat molding or heat sealing the top lid filtration layer and the outer periphery filtration layer together. In other embodiments, the top lid filtration layer may be adhered or sewn into the outer periphery filtration layer. It should be understood that the at least one filtration layer 108 may be divided into filtration layers having different structural shapes depending on the shape of the microphone assembly 100.

While the subject matter has been illustrated and described in detail in the drawings and foregoing description, the same is to be considered as illustrative and not restrictive in character. In reading the claims, it is intended that when words such as "a," "an," or "at least one," are used there is no intention to limit the claim to only one item unless specifically stated to the contrary in the claim. Unless specified or limited otherwise, the terms "mounted," "connected," and "coupled" and variations thereof are used broadly and encompass both direct and indirect mountings, connections, supports, and couplings. Further, "connected" and "coupled" are not restricted to physical or mechanical connections or couplings.

What is claimed is:

1. A microphone assembly comprising:

a transducer configured to convert air pressure variations of sound waves into electrical signals;

a transducer chamber configured to house the transducer;

a particle filtration system, wherein the particle filtration system comprises:

an outer support structure having a porosity of less than or equal to about fifty-five pores per square inch (55 PPI), a filtration layer, wherein the filtration layer is housed by the outer support structure, wherein the filtration layer includes at least one member of a group consisting of at least one layer of an electrostatic media filter, at least one layer of an activated carbon filter, and at least one layer of a nonwoven fabric filter, and a sleeve disposed between the filtration layer and the transducer chamber, the sleeve configured to grip the filtration layer and prevent the filtration layer from sliding from the transducer chamber, wherein the filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm, wherein the at least one layer of a nonwoven fabric filter includes an engineered fabric having a random arrangement of filaments or fabrics, wherein the nonwoven fabric filter is at least one member of a group consisting of: a meltblown nonwoven media filter and a spunbound nonwoven media filter, and wherein the filtration layer has a thickness between about 0.1 inches and about 0.5 inches.

2. The microphone assembly of claim 1, wherein the at least one layer of an electrostatic media filter comprises electrostatically charged synthetic fibers.

3. The microphone assembly of claim 1, further comprising an inner support structure disposed between the at least one filtration layer and the sleeve.

4. The microphone assembly of claim 1, further comprising an outer frame disposed outside the outer support structure, the outer frame configured to provide additional protection to the transducer chamber.

5. The microphone assembly of claim 1, wherein the porosity of the outer support structure ranges from about ten pores per square inch (10 PPI) to about forty-five pores per square inch (45 PPI).

6. The microphone assembly of claim 1, wherein an outer surface of the transducer chamber includes a ring along the periphery of the transducer chamber, and wherein the sleeve adapts to a surface of the ring, creating a seal between the transducer chamber and the sleeve.

7. A particle filtration system for a microphone assembly comprising:

an outer support structure;

at least one filtration layer housed by the outer support structure, wherein the at least one filtration layer includes at least one member of a group consisting of: at least one layer of an electrostatic media filter, at least one layer of an activated carbon filter, and at least one layer of a nonwoven fabric filter, the at least one filtration layer configured to filter particles from entering into a transducer chamber;

a sleeve disposed between the at least one filtration layer and the transducer chamber, the sleeve configured to grip the at least one filtration layer and prevent the at least one filtration layer from sliding from the transducer chamber, wherein the at least one filtration layer has a thickness between about 0.1 inches and about 0.5 inches, the at least one filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

8. The particle filtration system of claim 7, wherein the outer support structure has a porosity of less than or equal to about fifty-five pores per square inch (55 PPI).

9. The particle filtration system of claim 8, wherein the porosity of the outer support structure ranges from about ten pores per square inch (10 PPI) to about forty-five pores per square inch (45 PPI).

10. The particle filtration system of claim 7, wherein the at least one layer of an electrostatic media filter comprises electrostatically charged synthetic fibers.

11. The particle filtration system of claim 7, wherein the at least one layer of a nonwoven fabric filter includes an engineered fabric having a random arrangement of filaments or fabrics, wherein the nonwoven fabric filter is at least one member of a group consisting of: a meltblown nonwoven media filter and a spunbound nonwoven media filter.

12. The particle filtration system of claim 7, further comprising an inner support structure disposed between the at least one filtration layer and the sleeve.

13. The particle filtration system of claim 7, wherein the sleeve is a removable sleeve.

14. The particle filtration system of claim 7, further comprising an outer frame disposed outside the outer support structure, the outer frame configured to provide additional protection to the transducer chamber.

15. The particle filtration system of claim 7, wherein an outer surface of the transducer chamber includes a ring along the periphery of the transducer chamber, and wherein the sleeve adapts to a surface of the ring, creating a seal between the transducer chamber and the sleeve.

16. A particle filtration system for a microphone assembly comprising:

a filtration layer configured to filter particles from entering into a transducer chamber; and a sleeve disposed between the at least one filtration layer and the transducer chamber, the sleeve configured to grip the filtration layer and prevent the filtration layer from sliding from the transducer chamber, wherein the filtration layer has a thickness between about 0.1 inches and about 0.5 inches, and wherein the filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

17. The microphone assembly from claim 16, wherein the filtration layer is composed from at least one layer of an electrostatic media filter, at least one layer of an activated carbon filter, and at least one layer of a nonwoven fabric filter.

18. A microphone assembly comprising:

a transducer configured to convert air pressure variations of sound waves into electrical signals;

a transducer chamber configured to house the transducer;

a particle filtration system, wherein the particle filtration system comprises:

an outer support structure having a porosity of less than or equal to about fifty-five pores per square inch (55 PPI), a filtration layer, wherein the filtration layer is housed by the outer support structure, wherein the filtration layer includes at least one member of a group consisting of at least one layer of an electrostatic media filter, at least one layer of an activated carbon filter, and at least one layer of a nonwoven fabric filter, a sleeve disposed between the filtration layer and the transducer chamber, the sleeve configured to grip the filtration layer and prevent the filtration layer from sliding from the transducer chamber, and and inner support structure disposed between the at least one filtration layer and the sleeve, wherein the filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

19. A microphone assembly comprising:

a transducer configured to convert air pressure variations of sound waves into electrical signals;

a transducer chamber configured to house the transducer;

a particle filtration system, wherein the particle filtration system comprises:

an outer support structure having a porosity of less than or equal to about fifty-five pores per square inch (55 PPI), a filtration layer, wherein the filtration layer is housed by the outer support structure, wherein the filtration layer includes at least one member of a group consisting of at least one layer of an electrostatic media filter, at least one layer of an activated carbon filter, and at least one layer of a nonwoven fabric filter, and a sleeve disposed between the filtration layer and the transducer chamber, the sleeve configured to grip the filtration layer and prevent the filtration layer from sliding from the transducer chamber; and an outer frame disposed outside of the outer support structure, the outer frame configured to provide additional protection to the transducer chamber, wherein the filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

20. A microphone assembly comprising:

a transducer configured to convert air pressure variations of sound waves into electrical signals;

a transducer chamber configured to house the transducer;

a particle filtration system, wherein the particle filtration system comprises:

an outer support structure having a porosity of less than or equal to about fifty-five pores per square inch (55 PPI), a filtration layer, wherein the filtration layer is housed by the outer support structure, wherein the filtration layer includes at least one member of a group consisting of at least one layer of an electrostatic media filter, at least one layer of an activated carbon filter, and at least one layer of a nonwoven fabric filter, and a sleeve disposed between the filtration layer and the transducer chamber, the sleeve configured to grip the filtration layer and prevent the filtration layer from sliding from the transducer chamber, wherein an outer surface of the transducer chamber includes a ring along the periphery of the transducer chamber, and wherein the sleeve adapts to a surface of the ring, creating a seal between the transducer chamber and the sleeve, and wherein the filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

21. A particle filtration system for a microphone assembly comprising:

an outer support structure;

at least one filtration layer housed by the outer support structure, wherein the at least one filtration layer includes at least one member of a group consisting of: at least one layer of an electrostatic media filter, at least one layer of an activated carbon filter, and at least one layer of a nonwoven fabric filter, the at least one filtration layer configured to filter particles from entering into a transducer chamber;

a sleeve disposed between the at least one filtration layer and the transducer chamber, the sleeve configured to grip the at least one filtration layer and prevent the at least one filtration layer from sliding from the transducer chamber; and an inner support structure disposed between the at least one filtration layer and the sleeve, wherein the at least one filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

22. A particle filtration system for a microphone assembly comprising:

an outer support structure;

at least one filtration layer housed by the outer support structure, wherein the at least one filtration layer includes at least one member of a group consisting of: at least one layer of an electrostatic media filter, at least one layer of an activated carbon filter, and at least one layer of a nonwoven fabric filter, the at least one filtration layer configured to filter particles from entering into a transducer chamber;

a removable sleeve disposed between the at least one filtration layer and the transducer chamber, the removable sleeve configured to grip the at least one filtration layer and prevent the at least one filtration layer from sliding from the transducer chamber, wherein the at least one filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

23. A particle filtration system for a microphone assembly comprising:

an outer support structure;

at least one filtration layer housed by the outer support structure, wherein the at least one filtration layer includes at least one member of a group consisting of: at least one layer of an electrostatic media filter, at least one layer of an activated carbon filter, and at least one layer of a nonwoven fabric filter, the at least one filtration layer configured to filter particles from entering into a transducer chamber;

a sleeve disposed between the at least one filtration layer and the transducer chamber, the sleeve configured to grip the at least one filtration layer and prevent the at least one filtration layer from sliding from the transducer chamber; and an outer frame disposed outside the outer support structure, the outer frame configured to provide additional protection to the transducer chamber, wherein the at least one filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

24. A particle filtration system for a microphone assembly comprising:

an outer support structure;

at least one filtration layer housed by the outer support structure, wherein the at least one filtration layer includes at least one member of a group consisting of: at least one layer of an electrostatic media filter, at least one layer of an activated carbon filter, and at least one layer of a nonwoven fabric filter, the at least one filtration layer configured to filter particles from entering into a transducer chamber;

a sleeve disposed between the at least one filtration layer and the transducer chamber, the sleeve configured to grip the at least one filtration layer and prevent the at least one filtration layer from sliding from the transducer chamber, wherein an outer surface of the transducer chamber includes a ring along the periphery of the transducer chamber, and wherein the sleeve adapts to a surface of the ring, creating a seal between the transducer chamber and the sleeve, and wherein the at least one filtration layer provides a Minimum Efficient Reporting Value (MERV) rating greater than or equal to thirteen (13), and the filtration layer traps at least fifty-percent (50%) of particles between 0.3 μm and 1 μm, more than or equal to about eighty-five percent (85%) of particles between 1 μm and 3 μm and more than or equal to about ninety percent (90%) of particles between 3 μm and 10 μm.

* * * * *